(12) United States Patent
Tanimoto et al.

(10) Patent No.: US 6,434,705 B1
(45) Date of Patent: Aug. 13, 2002

(54) METHOD AND APPARATUS FOR INTERFACING ISOCHRONOUS COMMUNICATION SYSTEMS

(75) Inventors: Erika Tanimoto, Saitama; Hisaki Hiraiwa, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/270,196

(22) Filed: Mar. 15, 1999

(30) Foreign Application Priority Data

Mar. 18, 1998 (JP) .......................................... 10-068155

(51) Int. Cl.⁷ ................................................ G06F 1/04
(52) U.S. Cl. ...................... 713/500; 713/400; 713/600; 709/400; 710/61
(58) Field of Search ................................ 713/324, 400, 713/500, 501, 502, 503, 401, 600; 710/58, 61, 117, 124, 125; 709/400

(56) References Cited

U.S. PATENT DOCUMENTS

| | | | | |
|---|---|---|---|---|
| 4,961,188 A | * | 10/1990 | Lau | 370/94.2 |
| 5,329,531 A | * | 7/1994 | Diepstraten et al. | 370/94.2 |
| 5,761,431 A | * | 6/1998 | Gross et al. | 709/225 |
| 5,778,218 A | * | 7/1998 | Gulick | 713/503 |
| 5,781,554 A | * | 7/1998 | Organ | 370/474 |
| 5,809,426 A | * | 9/1998 | Radojevic et al. | 455/502 |
| 5,818,948 A | * | 10/1998 | Gulick | 381/77 |
| 6,122,749 A | * | 9/2000 | Gulick | 713/324 |
| 6,128,316 A | * | 10/2000 | Takeda et al. | 370/468 |
| 6,243,395 B1 | * | 6/2001 | Fujimori et al. | 370/466 |
| 6,351,783 B1 | * | 2/2002 | Garney et al. | 710/107 |

\* cited by examiner

*Primary Examiner*—Jeffrey Gaffin
*Assistant Examiner*—Rijue Mai
(74) *Attorney, Agent, or Firm*—Jay H. Maioli

(57) ABSTRACT

The present invention provides an information processing apparatus, system and method and a providing medium which allow establishment of isochronism in isochronous transactions between different environments. The information processing system includes a bridge for bridging a wire environment and a radio environment. The bridge includes a comparator which compares the count value of a cycle time register for the wire environment and the count value of another cycle time register for the radio environment with each other and outputs an error value between the count values as a cycle report packet to a node which acts as a cycle master in the radio environment. The node receives the cycle report packet transmitted thereto from the bridge and corrects the count value of a cycle time register thereof in response to contents of the cycle report packet. Then, the node transmits a frame synchronization packet to the other nodes in the radio environment at a timing in accordance with the corrected count value of the cycle time register. Each of the nodes resets the value of its an own built-in cycle time register in response to the frame synchronization packet transmitted thereto from the cycle master node.

13 Claims, 5 Drawing Sheets

24

42

METHOD AND APPARATUS FOR INTERFACING ISOCHRONOUS COMMUNICATION SYSTEMS

BACKGROUND OF THE INVENTION

This invention relates to an information processing apparatus, an information processing system, an information processing method and a providing medium, and more particularly to an information processing apparatus, an information processing system, an information processing method and a providing medium which allow, in order to perform an isochronous transaction between different environments in which different isochronization timings are used, establishment of isochronism between the different environments by comparing time information regarding to isochronization timings and by performing time management in different environments.

Standardization activity of a bridge format in the IEEE1394 environment is being proceeded by the P1394.1 (bridge) working group (refer to the P1394.1 Draft 0.03, Oct. 18, 1997). The IEEE1394 bridge (hereinafter referred to simply as bridge) is composed of a set of apparatus called portals connected to the IEEE1394 bus (hereinafter referred to suitably as bus), so that data can be transmitted between a plurality of (two or more) buses through the bridge. Transmission of data through the bridge (between portals) can be performed using, for example, a cable, a radio wave or an infrared ray.

The bridge can be used also for transaction between a wire environment and a radio environment. For example, as shown in FIG. 6, the bridge can be used for transaction therethrough between an IEEE1394 environment (wire environment) wherein nodes 101-1 to 101-6 are interconnected by an IEEE1394 bus (or an IEEE1394 cable) and a radio environment wherein a radio system is used for exchanging data between nodes 102-1 and 102-2. In such a system as shown in FIG. 6, each node in the radio environment can be regarded as a member of the bridge. For example, in the system shown in FIG. 6, a combination of the node 102-1 and the node 101-16 can be treated as one bridge 110.

By the way, the IEEE1394 standards prescribe that one cycle of isochronous transaction is 125 $\mu$s which is an interval of a cycle master node which is one of nodes connected to an IEEE1394 bus to transmit a cycle start packet. Each of the nodes receives the cycle start packet and adjusts (reset) the value (count value) of an own built-in cycle time register to establish cycle Isochronism (hereinafter referred to merely as isochronism).

However, in transaction between different environments through a bridge described above, since the reset interval (isochronization timing) of a cycle time register of each node differs from each environment (for example, the interval is 4 ms with the radio environment), matching of isochronization cannot be achieved.

SUMMARY OF THE INVENTION

It is thus an object of the present invention to provide an information processing apparatus, an information processing system, an information processing method and a providing medium which allow establishment of isochronism in isochronous transaction among different environments.

In order to attain the object described above, according to the present invention, when isochronous transaction is to be performed between different environments whose isochronization timings are different from each other, time information regarding isochronization timings of the individual environments is compared with each other, and time management between the environments is performed in response to a result of the comparison to establish isochronism between the different environments.

In particular, according to an aspect of the present invention, there is provided an information processing apparatus, including a comparison means for comparing first time information regarding an isochronization timing of isochronous transaction in a first environment and second time information regarding an isochronization timing of isochronous transaction in a second environment with each other, and a transmission means for transmitting a result of the comparison by the comparison means to another information processing apparatus of the second environment.

According to another aspect of the present invention, there is provided an information processing method, including a comparison step of comparing first time information regarding an isochronization timing of isochronous transaction in a first environment and second time information regarding an isochronization timing of isochronous transaction in a second environment with each other, and a transmission step of transmitting a result of the comparison by the comparison step to another information processing apparatus of the second environment.

According to a further aspect of the present invention, there is provided a providing medium which provides a computer-readable program for causing an information processing apparatus to execute a process including a comparison step of comparing first time information regarding an isochronization timing of isochronous transaction in a first environment and second time information regarding an isochronization timing of isochronous transaction in a second environment with each other, and a transmission step of transmitting a result of the comparison by the comparison step to another information processing apparatus of the second environment.

In the information processing apparatus, information processing method and providing medium described above, first time information regarding an isochronization timing of isochronous transaction in the first environment and second time information regarding an isochronization timing of isochronous transaction in the second environment are compared with each other, and a result of the comparison is transmitted to another information processing apparatus of the second environment. Consequently, for example, where isochronous transaction is to be performed between a wire environment and a radio environment, time information regarding an isochronization timing in the wire environment can be reflected on time information regarding an isochronization timing in the radio environment. Therefore, matching of isochronism between the two environments can be maintained.

According to a still further aspect of the present invention, there is provided an information processing apparatus, comprising a reception means for receiving comparison information between first time information regarding an isochronization timing of isochronous transaction in a first environment and second time information regarding an isochronization timing of isochronous transaction in a second environment, the comparison information being transmitted from another information processing apparatus, a correction means for correcting time information of the information processing apparatus in response to the comparison information received by the reception means, and a time management means for performing time management of the second environment in accordance with the time information corrected by the correction means.

According to a yet further aspect of the present invention, there is provided an information processing method for an information processing apparatus, having a reception step of receiving comparison information between first time information regarding an isochronization timing of isochronous transaction in a first environment and second time information regarding an isochronization timing of isochronous transaction in a second environment, the comparison information being transmitted from another information processing apparatus, a correction step of correcting time information of the information processing apparatus in response to the comparison information received by the reception step, and a time management step of performing time management of the second environment in accordance with the time information corrected by the correction step.

According to a yet further aspect of the present invention, there is provided a providing medium which provides a computer-readable program for causing an information processing apparatus to execute a process having a reception step of receiving comparison information between first time information regarding an isochronization timing of isochronous transaction in a first environment and second time information regarding an isochronization timing of isochronous transaction in a second environment, the comparison information being transmitted from another information processing apparatus, a correction step of correcting time information of the information processing apparatus in response to the comparison information received by the reception step, and a time management step of performing time management of the second environment in accordance with the time information corrected by the correction step.

In the information processing apparatus, information processing method and providing medium described above, comparison information between first time information regarding an isochronization timing of isochronous transaction in the first environment and second time information regarding an isochronization timing of isochronous transaction in the second environment transmitted from another information processing apparatus is received, and time information of the information processing apparatus is corrected in response to the received comparison information. Then, time management of the second environment is performed in accordance with the corrected time information. Consequently, for example, where isochronous transaction is to be performed between a wire environment and a radio environment, time information regarding an isochronization timing in the wire environment can be reflected on time information regarding an isochronization timing in the radio environment. Therefore, matching of isochronism between the two environments can be maintained.

According to a yet further aspect of the present invention, there is provided an information processing system, having a first information processing apparatus for performing isochronous transaction between a first environment and a second environment, and a second information processing apparatus for performing time management of isochronous transaction in the second environment, the first information processing apparatus including a comparison means for comparing first time information regarding an isochronization timing of isochronous transaction in the first environment and second time information regarding an isochronization timing of isochronous transaction in the second environment with each other, and a transmission means for transmitting a result of the comparison by the comparison means to the second information processing apparatus, the second information processing apparatus including a reception means for receiving the result of the comparison transmitted by the transmission means of the first information processing apparatus, a correction means for correcting time information of the second information processing apparatus in response to the time information received by the reception means, and a time management means for performing time management of isochronous transaction in the second environment in accordance with the time information corrected by the correction means.

According to a yet further aspect of the present invention, there is provided an information processing method for an information processing system which includes a first information processing apparatus for performing isochronous transaction between a first environment and a second environment, and a second information processing apparatus for performing time management of isochronous transaction in the second environment, comprising a comparison step performed by the first information processing apparatus of comparing first time information regarding an isochronization timing of isochronous transaction in the first environment and second time information regarding an isochronization timing of isochronous transaction in the second environment with each other, a transmission step performed by the first information processing apparatus of transmitting a result of the comparison by the comparison step to the second information processing apparatus, a reception step performed by the second information processing apparatus of receiving the result of the comparison transmitted by the transmission step of the first information processing apparatus, a correction step performed by the second information processing apparatus of correcting the time information of the second information processing apparatus in response to the result of the comparison received by the reception step, and a time management step performed by the second information processing apparatus of performing time management of isochronous transaction in the second environment in accordance with the time information corrected by the correction step.

According to a yet further aspect of the present invention, there is provided a providing medium which provides a computer-readable program for causing an information processing system, which includes a first information processing apparatus for performing isochronous transaction between a first environment and a second environment, and a second information processing apparatus for performing time management of isochronous transaction in the second environment, to execute a process comprising a comparison step performed by the first information processing apparatus of comparing first time information regarding an isochronization timing of isochronous transaction in the first environment and second time information regarding an isochronization timing of isochronous transaction in the second environment with each other, a transmission step performed by the first information processing apparatus of transmitting a result of the comparison by the comparison step to the second information processing apparatus, a reception step performed by the second information processing apparatus of receiving the result of the comparison transmitted by the transmission step of the first information processing apparatus, a correction step performed by the second information processing apparatus of correcting the time information of the second information processing apparatus in response to the result of the comparison received by the reception step, and a time management step performed by the second information processing apparatus of performing time management of isochronous transaction in the second environment in accordance with the time information corrected by the correction step.

In the information processing system, information processing method and providing medium described above, the first information processing apparatus compares first time information regarding an isochronization timing of isochronous transaction in the first environment and second time information regarding an isochronization timing of isochronous transaction in the second environment with each other, and transmits a result of the comparison to the second information processing apparatus. Then, the second information processing apparatus receives the result of the comparison transmitted by the first information processing apparatus, corrects the time information of the second information processing apparatus in response to the received result of the comparison, and performs time management of isochronous transaction in the second environment in accordance with the corrected time information. Consequently, for example, where isochronous transaction is to be performed between a wire environment and a radio environment, matching of isochronism between the two environments can be maintained.

The above and other objects, features and advantages of the present invention will become apparent from the following description and the appended claims, taken in conjunction with the accompanying drawings in which like parts or elements are denoted by like reference symbols.

DESCRIPTION OF A PREFERRED EMBODIMENT

Figure 1:
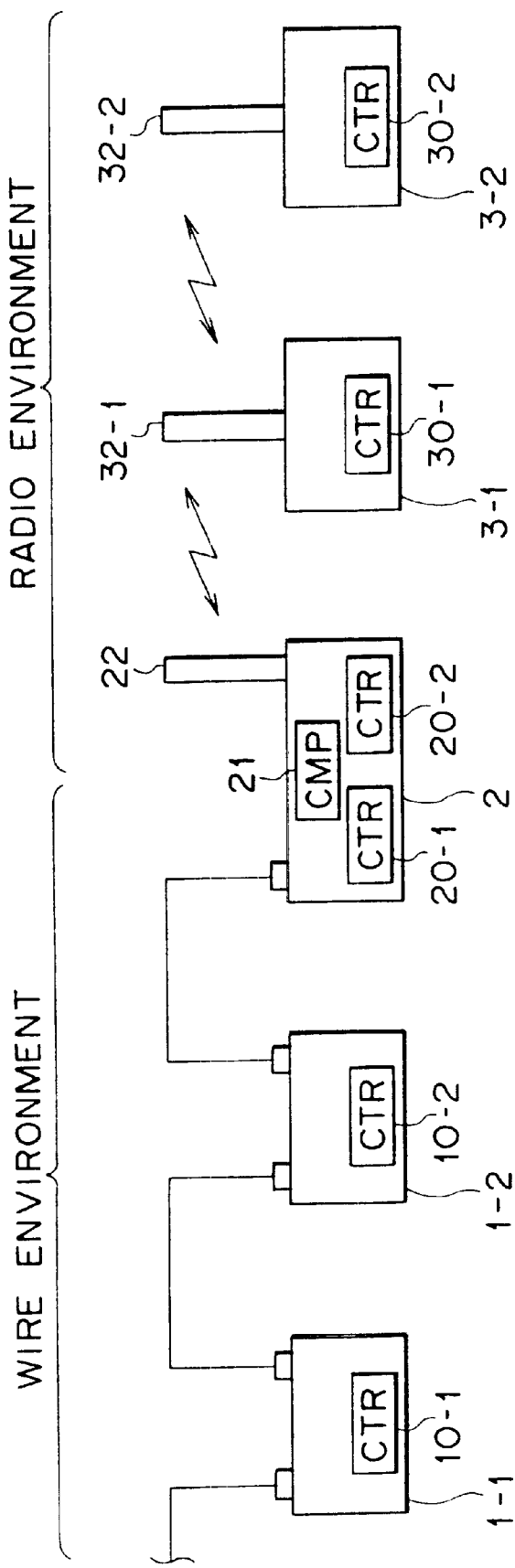
FIG. 1 is a block diagram showing an example of a construction of an information processing system to which the present invention is applied.

Before a preferred embodiment of the present invention is described, in order to make clear a corresponding relationship between various features recited in the claims and elements of the embodiment of the present invention described below, the features of the present invention are described below together with the corresponding elements to which reference symbols denoting them are added in parentheses following them. However, this description provides a mere example and does not signify that the features of the present invention be limited to the recited elements.

An information processing apparatus of the present invention provides a comparison means (for example, a comparator 21 of FIG. 2) for comparing first time information regarding an isochronization timing of isochronous transaction in a first environment and second time information regarding an isochronization timing of isochronous transaction in a second environment with each other, and a transmission means (for example, a radio transmission/reception section 25 of FIG. 2) for transmitting a result of the comparison by the comparison means to another information processing apparatus of the second environment.

An information processing apparatus of the present invention provides a reception means (for example, a radio transmission/reception section 61 of FIG. 5) for receiving comparison information between first time information regarding an isochronization timing of isochronous transaction in a first environment and second time information regarding an isochronization timing of isochronous transaction in a second environment, the comparison information being transmitted from another information processing apparatus, a correction means (for example, a PLL section 63 of FIG. 2) for correcting time information of the information processing apparatus in response to the comparison information received by the reception means, and a time management means (for example, a cycle time register 62 of FIG. 5) for performing time management of the second environment in accordance with the time information corrected by the correction means.

Referring first to FIG. 1, there is shown an example of a construction of a transaction system or information processing system in which an information processing apparatus to which the present invention is applied is incorporated. It should be noted that the information processing apparatus is denoted also as node, and in the present specification, the term "system" is used to signify a whole apparatus composed of a plurality of apparatus or units. The transaction system shown includes a wire environment wherein nodes 1-1 and 1-2 and a bridge 2 communicate over a cable (for example, an IEEE1394 cable), and a radio environment wherein the bridge 2 and nodes 3-1 and 3-2 communicate by radio through antennae 22, 32-1 and 32-2, respectively. The wire environment and the radio environment can communicate with each other through the bridge 2. It is to be noted that, while the bridge 2 is shown as a node in FIG. 1, actually the bridge 2 is composed of two nodes including a node for the wire environment and another node for the radio environment. Further, naturally the number of nodes included in each of the environments is not limited to the number of nodes shown in FIG. 1.

The nodes 1-1 and 1-2 in the wire environment include cycle time registers (CTR) 10-1 and 10-2, respectively. The bridge 2 includes a cycle time register (CTR) 20-1 for counting the cycle times (time information) in the wire environment, and another cycle time register (CTR) 20-2 for counting the number of cycle times in the radio environment. The bridge 2 further includes a comparator (CMP) 21 for comparing the count values of the two cycle time register 20-1 and 20-2 with each other. The bridge 2 performs transaction between the wire environment and the radio environment and serves as a cycle reporter which reports a comparison value (error value) between the count values of the cycle time registers 20-1 and 20-2 to the node 3-1 which serves as a cycle master in the radio environment.

In the system shown in FIG. 1, the node 1-1 acts as a cycle master which provides a time reference (time reference in an isochronous transaction mode) to all nodes included in the wire environment and the radio environment. Thus, the node 1-1 transmits a cycle start packet to the nodes in the wire environment (in the system shown, to the node 1-2 and the bridge 2), for example, after every 125 μs. Each node in the wire environment receives the cycle start packet transmitted thereto from the cycle master (node 1-1) and resets the count value of the cycle time register built therein. It is to be noted that the cycle master in the wire environment may naturally be any node other than the node 1-1.

The nodes 3-1 and 3-2 in the radio environment include cycle time registers (CTR) 30-1 and 30-2, respectively. The node 3-1 acts as a cycle master in the radio environment and transmits a frame synchronization (sync) packet, which indicates a start of a frame, to the nodes in the radio environment (bridge 2 and node 3-2), for example, after every 4 ms. Each node in the radio environment receives the frame synchronization packet and resets the count value of the cycle time register built therein. It should be noted that the cycle master in the radio environment may be any other node than the node 3-1.

Figure 2:
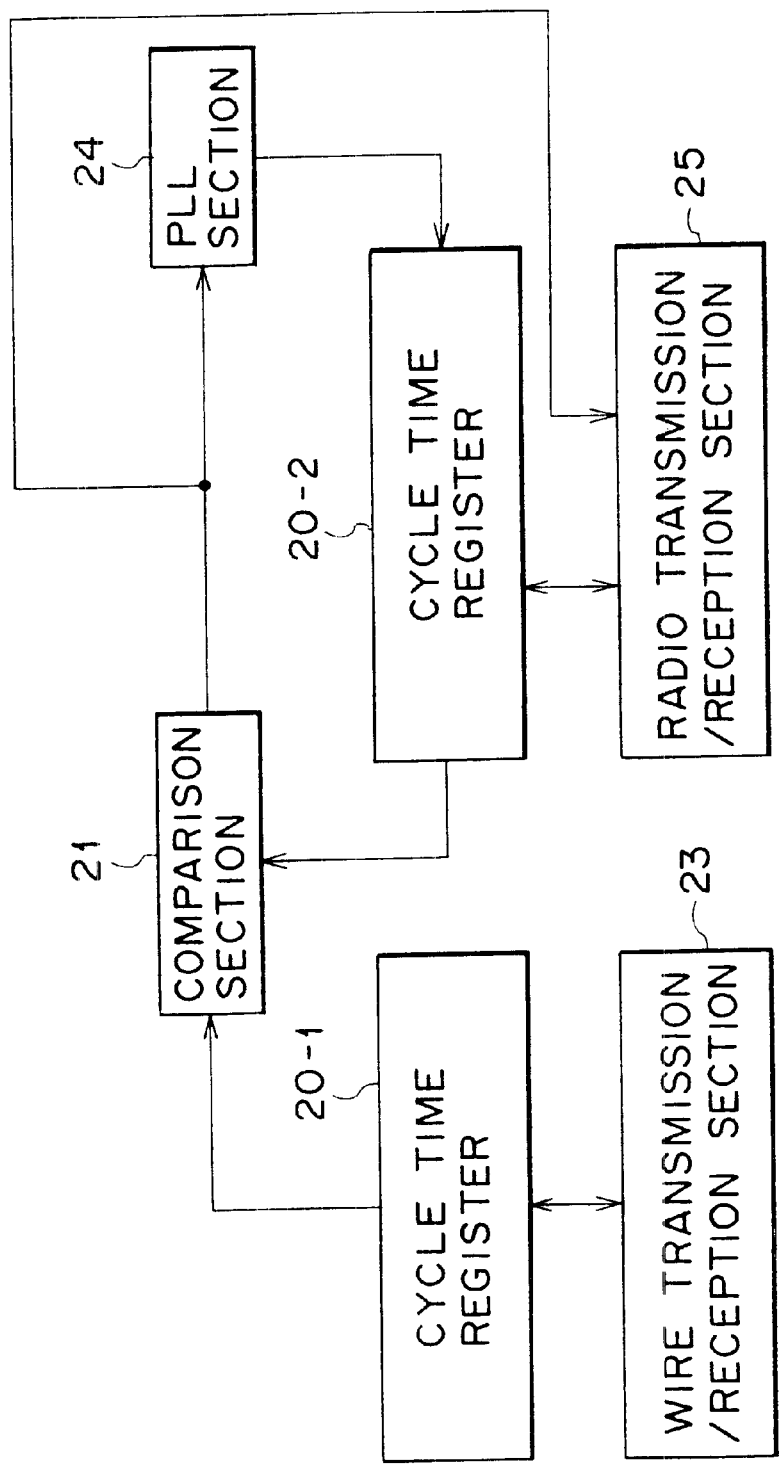
FIG. 2 is a block diagram showing an example of a rather detailed construction of a bridge of the information processing system shown in FIG. 1.

FIG. 2 shows an example of a rather detailed construction of the bridge 2. The bridge 2 shown includes a wire transmission/reception section 23 which decodes a prescribed packet received over the cable and outputs the data obtained by the decoding to the cycle time register 20-1 or some other apparatus not shown. Further, the wire transmission/reception section 23 converts the data supplied thereto from the cycle time register 20-1 or some other apparatus not shown into packets and transmits the packets over the cable. The cycle time register 20-1 counts the cycle times in the wire environment and resets the count value thereof in response to a cycle start packet transmitted from the node 1-1 and received by the wire transmission/reception section 23. The cycle time register 20-1 supplies its count value to the comparator 21.

A radio transmission/reception section 25 receives data (a packet) transmitted from any node in the radio environment through an antenna 22, decodes the received data and outputs the decoded data to the cycle time register 20-2 or some other apparatus not shown. Further, the radio transmission/reception section 25 converts data supplied thereto from the cycle time register 20-2 or some other apparatus not shown into packets and transmits the packets through the antenna 22. The cycle time register 20-2 counts the cycle times in the radio environment and resets the count value thereof in response to a frame start packet transmitted from the node 3-1 and received through the antenna 22 and the radio transmission/reception section 25.

The comparator 21 compares the count value of the cycle time register 20-1 and the count value of the cycle time register 20-2 with each other and outputs an error value between them to a PLL section 24 and the radio transmission/reception section 25. The PLL section 24 outputs, in response to the error value supplied thereto from the comparator 21, a correction signal for correcting the count value of the cycle time register 20-2 to the cycle time register 20-2. The cycle time register 20-2 corrects the count value thereof in response to the correction signal supplied thereto from the PLL section 24. It should be noted that the IEEE1394 standards do not specify counting down of the value of a cycle register, and two different correction methods, that is, to advance the count value by one clock, that is, to increment the count value by two for one clock, and to retard the count value by one clock, that is, to hold the count value for one clock, are used. Accordingly, also the cycle time registers in the radio environment use the two correction methods as described.

The error value between the cycle time register 20-1 and the cycle time register 20-2 outputted from the comparator 21, that is, the error value between the cycle time in the wire environment and the cycle time in the radio environment, is transmitted as a cycle report packet to the node 3-1, which is the cycle master in the radio environment, by the radio transmission/reception section 25.

Figure 3:
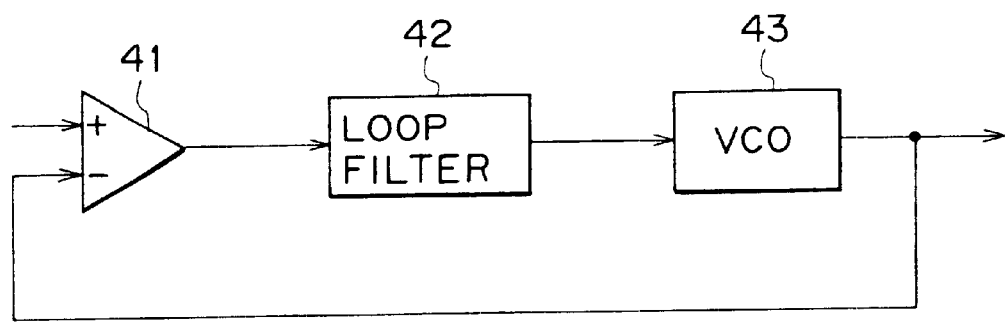
FIG. 3 is a block diagram showing an example of a detailed construction of a PLL section of the bridge shown in FIG. 2.

FIG. 3 shows an example of a construction of the PLL section 24. Referring to FIG. 3, the PLL section 24 shown includes a subtraction section 41, a loop filter 42, and a voltage-controlled oscillator (VCO) 43. The subtraction section 41 subtracts an output of the VCO 43 from an output of the comparator 21 shown in FIG. 2 and outputs a resulting value to the loop filter 42. The loop filter 42 filters the output of the subtraction section 41 and outputs a resulting signal to the VCO 43. The VCO 43 outputs a correction signal to the cycle time register 20-2 shown in FIG. 2 in response to the output of the loop filter 42.

Figure 4:
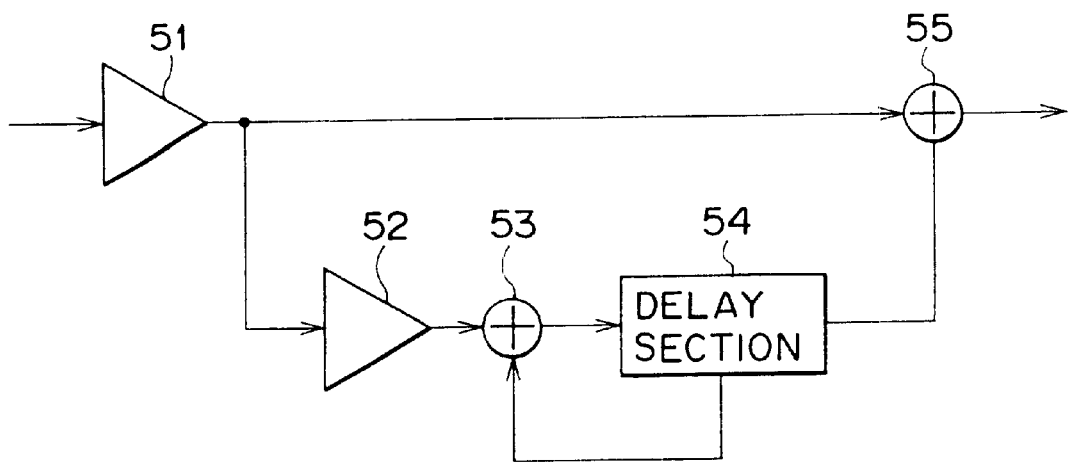
FIG. 4 is a block diagram showing an example of a detailed construction of a loop filter of the PLL section shown in FIG. 3.

FIG. 4 shows an example of a construction of the loop filter 42. Referring to FIG. 4, the loop filter 42 shown includes a pair of amplification sections 51 and 52, an addition section 53, a delay section 54, and another addition section 55. An output of the subtraction section 41 shown in FIG. 3 is inputted to and amplified by the amplification section 51, and then outputted to the addition section 55 and the amplification section 52. The amplification section 52 amplifies the output of the amplification section 51 and outputs a resulting signal to the addition section 53. The addition section 53 adds the output of the amplification section 52 and an output of the delay section 54 and outputs a resulting signal to the delay section 54. The delay section 54 delays the output of the addition section 53 and outputs a resulting signal to the addition sections 53 and 55. The addition section 55 adds the output of the amplification section 51 and the output of the delay section 54 and outputs a resulting signal to the VCO 43 shown in FIG. 3.

Figure 5:
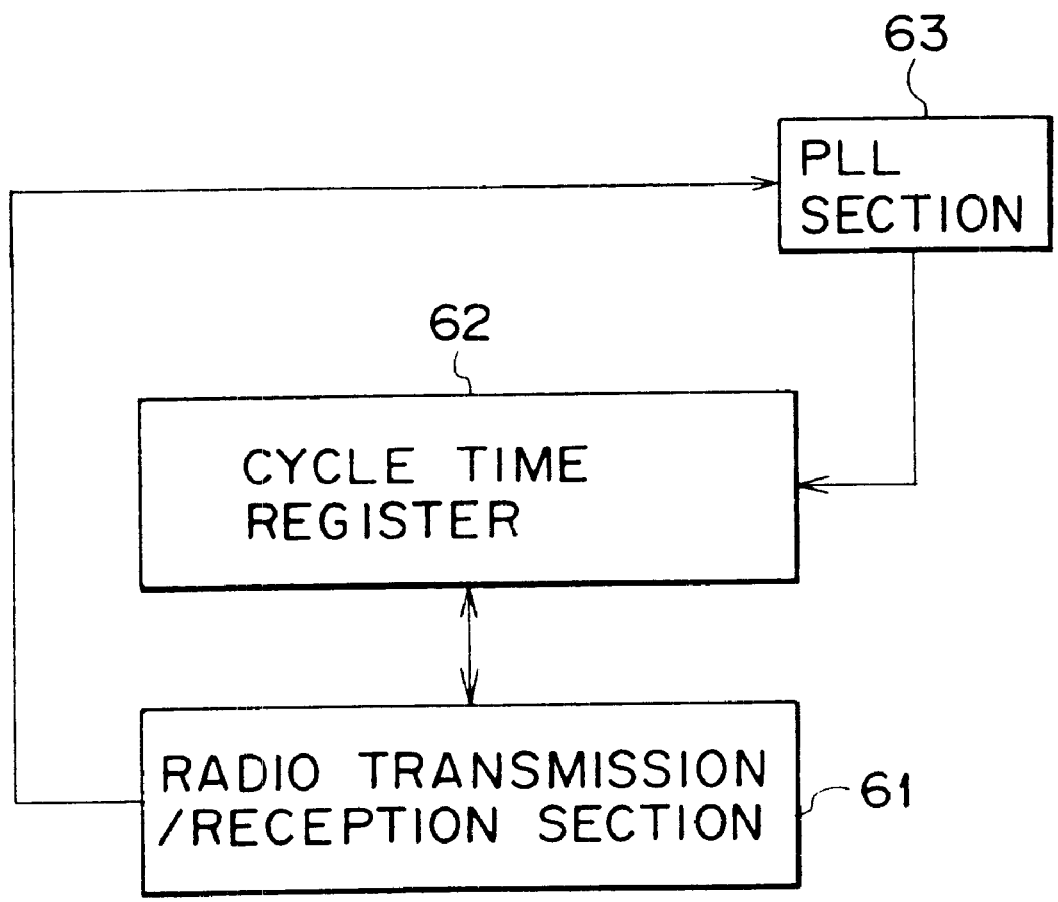
FIG. 5 is a block diagram showing an example of a rather detailed construction of a node shown in FIG. 1.
Figure 6:
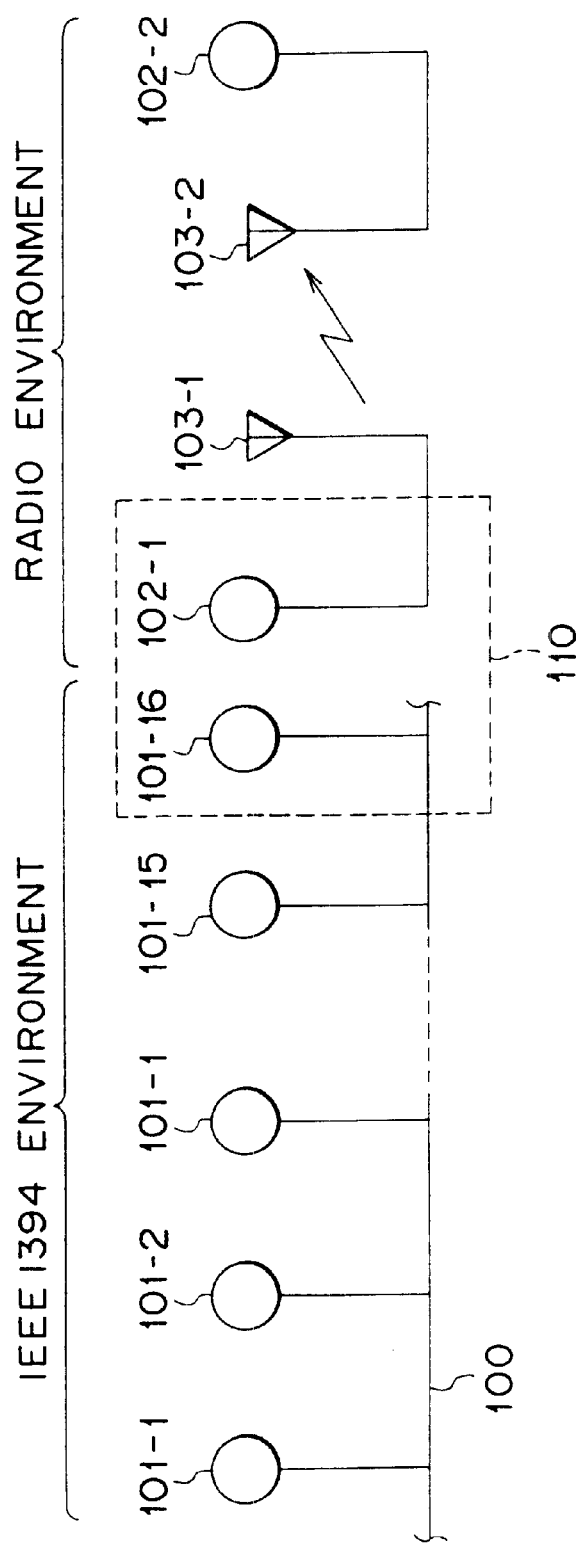
FIG. 6 is a block diagram showing an example of a construction of a related art information processing system.

FIG. 5 shows an example of a rather detailed construction of the node 3-1 shown in FIG. 1. Referring to FIG. 5, the node 3-1 shown includes a radio transmission/reception section 61 which decodes a packet received through the antenna 32-1 and outputs resulting data to a cycle time register 62 and a PLL section 63 or some other apparatus not shown. The cycle time register 62 counts the cycle time in the radio environment. The PLL section 63 generates a correction signal for correction of the count value of the cycle time register 62 in response to an error value which is contents of a cycle report packet transmitted from the bridge 2 and received by the radio transmission/reception section 61, and outputs the correction signal to the cycle time register 62. The cycle time register 62 corrects the count value thereof in response to the correction signal supplied thereto from the PLL section 63. Since the cycle time register 62 is corrected through the PLL section 63 in this manner, clock jitters during correction can be reduced. It is to be noted that the PLL section 63 has a construction similar to that of the PLL section 24 described hereinabove with reference to FIG. 3, and accordingly, description of it is omitted here to avoid redundancy.

Operation of the information processing system is described below. In the bridge 2, the comparator 21 compares the count value of the cycle time register 20-1 and the count value of the cycle time register 20-2 with each other, or in other words, the comparator 21 compares the value of a cycle time in the wire environment and the value of a cycle time in the radio environment with each other. The radio transmission/reception section 25 transmits an error value between the two count values from the comparator 21 as a cycle report packet to the node 3-1 which is the cycle master in the radio environment.

In the node 3-1, the radio transmission/reception section 61 receives the cycle report packet transmitted thereto from the bridge 2, decodes the cycle report packet and outputs an error value obtained by the decoding to the PLL section 63. The PLL section 63 outputs a correction signal to the cycle time register 62 in response to the error value supplied thereto from the radio transmission/reception section 61. The cycle time register 30-1 corrects the value of the cycle time in response to the correction signal supplied thereto from the PLL section 63. Then, the node 3-1 transmits a frame synchronization packet to the nodes in the radio environment at a timing in accordance with the corrected count value of the cycle time register 30-1. Each of the nodes in the radio environment adjusts the count value of its own built-in cycle time register in response to the frame synchronization packet transmitted thereto from the node 3-1.

It should be noted that, while the information processing system of the embodiment described above performs isochronous transaction between the wire environment and the radio environment, the present invention can be applied to any information processing system wherein isochronous transaction is performed between any other different environments.

Further, a computer program for providing such various processes as described above can be provided through a recording medium such as a magnetic disk or a CD-ROM to a user or can be provided through a providing medium such as a network, or may be stored in a built-in RAM or hard disk so that it may be utilized later in accordance with the necessity.

While a preferred embodiment of the present invention has been described using specific terms, such description is for illustrative purpose only, and it is to be understood that changes and variations may be made without departing from the spirit or scope of the following claims.

What is claimed is:

1. An information processing apparatus, comprising:
   comparison means for comparing first time information regarding an isochronization timing of an isochronous transaction occurring in a first environment with second time information regarding an isochronization timing of an isochronous transaction occurring in a second environment; and
   transmission means for transmitting a comparison result from said comparison means to another information processing apparatus of said second environment.

2. The information processing apparatus according to claim 1, wherein said first environment is a wire environment and said second environment is a radio wave environment.

3. The information processing apparatus according to claim 1, wherein the another information processing apparatus of said second environment is a cycle master for performing time management of said isochronous transaction in said second environment.

4. An information processing method, comprising:
   a comparison step of comparing first time information regarding an isochronization timing of a isochronous transaction occurring in a first environment with second time information regarding an isochronization timing of an isochronous transaction occurring in a second environment; and
   a transmission step of transmitting a comparison result of said comparison step to another information processing apparatus of said second environment.

5. A providing method which provides a computer-readable program for causing an information processing apparatus to execute a process comprising:
   a comparison step of comparing first time information regarding an isochronization timing of an isochronous transaction occurring in a first environment with second time information regarding an isochronization timing of an isochronous transaction occurring in a second environment; and
   a transmission step of transmitting a comparison result of said comparison step to another information processing apparatus of said second environment.

6. An information processing apparatus, comprising:
   reception means for receiving comparison information between first time information regarding an isochronization timing of an isochronous transaction occurring in a first environment and second time information regarding an isochronization timing of an isochronous transaction occurring in a second environment, the comparison information being transmitted to said reception means from another information processing apparatus;
   correction means for correcting time information of said information processing apparatus in response to the comparison information received by said reception means; and
   time management means for performing time management of said second environment in accordance with the time information corrected by said correction means.

7. The information processing apparatus according to claim 6, wherein said first environment is a wire environment and said second environment is a radio wave environment.

8. The information processing apparatus according to claim 6, wherein said correction means includes a PLL (phase-locked loop) for correcting the time information.

9. An information processing method for an information processing apparatus, comprising:
   a reception step of receiving comparison information between first time information regarding an isochronization timing of an isochronous transaction occurring in a first environment and second time information regarding an isochronization timing of an isochronous transaction occurring in a second environment, the comparison information being transmitted from another information processing apparatus;
   a correction step of correcting time information of said information processing apparatus in response to the comparison information received by said reception step; and
   a time management step of performing time management of said second environment in accordance with the time information corrected by said correction step.

10. A providing method which provides a computer-readable program for causing an information processing apparatus to execute a process comprising:
    a reception step of receiving comparison information between first time information regarding an isochronization timing of an isochronous transaction occurring in a first environment and second time information regarding an isochronization timing of an isochronous transaction occurring in a second environment, the comparison information being transmitted from another information processing apparatus;
    a correction step of correcting time information of said information processing apparatus in response to the comparison information received by said reception step; and
    a time management step of performing time management of said second environment in accordance with the time information corrected by said correction step.

11. An information processing system, comprising:

a first information processing apparatus for performing an isochronous transaction between a first environment and a second environment; and a second information processing apparatus for performing time management of an isochronous transaction occurring in said second environment;

said first information processing apparatus including:

comparison means for comparing first time information regarding an isochronization timing of an isochronous transaction occurring in said first environment with second time information regarding an isochronization timing of an isochronous transaction occurring in said second environment; and transmission means for transmitting a result of the comparison by said comparison means to said second information processing apparatus;

said second information processing apparatus including:

reception means for receiving the result of the comparison transmitted by said transmission means of said first information processing apparatus;

correction means for correcting time information of said second information processing apparatus in response to the result of the comparison received by said reception means; and time management means for performing time management of an isochronous transaction occurring in said second environment in accordance with the time information corrected by said correction means.

12. An information processing method for an information processing system which includes a first information processing apparatus for performing an isochronous transaction between a first environment and a second environment, and a second information processing apparatus for performing time management of an isochronous transaction occurring in said second environment, comprising:

a comparison step performed by said first information processing apparatus for comparing first time information regarding an isochronization timing of an isochronous transaction occurring in said first environment with second time information regarding an isochronization timing of an isochronous transaction occurring in said second environment;

a transmission step performed by said first information processing apparatus for transmitting a result of the comparison by said comparison step to said second information processing apparatus;

a reception step performed by said second information processing apparatus for receiving the result of the comparison transmitted by said transmission step;

a correction step performed by said second information processing apparatus for correcting time information of said second information processing apparatus in response to the result of the comparison received by said reception step; and a time management step performed by said second information processing apparatus for performing time management of an isochronous transaction occurring in said second environment in accordance with the time information corrected by said correction step.

13. A providing method which provides a computer-readable program for causing an information processing system, which includes a first information processing apparatus for performing an isochronous transaction between a first environment and a second environment, and a second information processing apparatus for performing time management of an isochronous transaction occurring in said second environment, to execute a process comprising:

a comparison step performed by said first information processing apparatus for comparing first time information regarding an isochronization timing of an isochronous transaction occurring in said first environment with second time information regarding an isochronization timing of an isochronous transaction occurring in said second environment;

a transmission step performed by said first information processing apparatus for transmitting a result of the comparison by said comparison step to said second information processing apparatus;

a reception step performed by said second information processing apparatus for receiving the result of the comparison transmitted by said transmission step;

a correction step performed by said second information processing apparatus for correcting time information of said second information processing apparatus in response to the result of the comparison received by the reception step; and a time management step performed by said second information processing apparatus for performing time management of an isochronous transaction occurring in said second environment in accordance with the time information corrected by the correction step.

\* \* \* \* \*